(12) United States Patent  
Chakraborty et al.

(10) Patent No.: US 10,282,058 B1  
(45) Date of Patent: May 7, 2019

(54) TOUCH SCREEN CONTEXT MENU

(71) Applicant: Workday, Inc., Pleasanton, CA (US)

(72) Inventors: Sayan Chakraborty, Niwot, CO (US); Jesse Spencer, Denver, CO (US); Chris Chan, Denver, CO (US); Brian Ledbetter, Boulder, CO (US)

(73) Assignee: Workday, Inc., Pleasanton, CA (US)

( * ) Notice: Subject to any disclaimer, the term of this patent is extended or adjusted under 35 U.S.C. 154(b) by 569 days.

(21) Appl. No.: 14/866,596

(22) Filed: Sep. 25, 2015

(51) Int. Cl.
*G06F 3/0481* (2013.01)
*G06F 3/0482* (2013.01)
*G06F 3/041* (2006.01)
*G06F 3/0488* (2013.01)

(52) U.S. Cl.
CPC .......... *G06F 3/0482* (2013.01); *G06F 3/0412* (2013.01); *G06F 3/0416* (2013.01); *G06F 3/04817* (2013.01); *G06F 3/04883* (2013.01); *G06F 3/04886* (2013.01); *G06F 2203/04104* (2013.01); *G06F 2203/04808* (2013.01)

(58) Field of Classification Search
CPC ..... G06F 3/0482; G06F 3/0488; G06F 3/0481
See application file for complete search history.

(56) References Cited

U.S. PATENT DOCUMENTS

| | | | |
|---|---|---|---|
| 2008/0235627 A1* | 9/2008 | Torning | G06F 3/0482 715/841 |
| 2012/0272144 A1* | 10/2012 | Radakovitz | G06F 3/04883 715/702 |
| 2013/0019182 A1* | 1/2013 | Gil | G06F 3/0482 715/738 |
| 2015/0324069 A1* | 11/2015 | Raszka | G06F 3/0481 715/834 |
| 2015/0350263 A1* | 12/2015 | Madhusudhanan | G06Q 10/10 715/753 |

* cited by examiner

*Primary Examiner* — Andrea C Leggett
(74) *Attorney, Agent, or Firm* — Van Pelt, Yi & James LLP (57) ABSTRACT

A system for context menus including an input interface and a processor. The input interface is to receive an activation indication for a context menu. The processor is to provide display information for a first context menu, wherein the context menu comprises a set of petals in a pattern centered on an item.

18 Claims, 12 Drawing Sheets

|    | A | B | C | D |
|----|---|---|---|---|
| 1  |   |   |   |   |
| 2  |   |   |   |   |
| 3  |   |   |   |   |
| 4  |   |   |   |   |
| 5  |   |   |   |   |
| 6  |   |   |   |   |
| 7  |   |   |   |   |
| 8  |   |   |   |   |
| 9  |   |   |   |   |
| 10 |   |   |   |   |

TOUCH SCREEN CONTEXT MENU

BACKGROUND OF THE INVENTION

A user interface for a computing system typically includes functionality for context menus. Context menus are menus of relevant actions brought up within the context of a particular user interface object, typically by performing a special indication on the object (e.g., a right click, a control-click, a long click, etc.). A user interface object has an associated context menu filled with actions appropriate to the object. When the context menu is activated it appears rooted at the object, as a menu of options. Traditional context menus require a large amount of screen real estate and precision when selecting a menu item, are suited to multi-button pointing devices, and are not suited for touch interfaces and fluid gestures.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A touch screen context menu is disclosed. A system for context menus comprises an input interface for receiving an activation indication for a context menu, and a processor for providing display information for a first context menu, wherein the context menu comprises a set of petals in a pattern centered on an item.

In some embodiments, a touch screen context menu comprises a context menu designed for use on a touch screen computing device (e.g., a smartphone, a tablet computer, a touch screen computer, etc.). The touch screen context menu provides information using an amount of screen real estate appropriate for a small display, and receives user input in a way that is suited to touch screen input (e.g., not requiring more accuracy than is possible using a finger on a touch screen). In some embodiments, the touch screen context menu provides accessibility for certain disabilities (e.g., disabilities affecting finger stability, etc.). The touch screen user activates the menu using an activation indication (e.g., a tap, a double tap, a hard tap, a two finger tap, long press, 3D touch, etc.). When activated, the touch screen context menu provides menu options using a set of petals in a pattern centered on an item. In some embodiments, the flower petals are animated into place aiding in drawing attention to the menu items on the petals. The user can select a menu option either by tapping it or by sliding to it. Only a limited number of menu options can be shown in this way (e.g., 2, 3, 4, 5, or 6 options), so, when necessary, one petal of the set of displayed petals comprises an option to display a next context menu for sub-choices. A cycling set of context menus can be shown, comprising a full set of context menu options. In some embodiments, the displayed pattern of petals changes in each context menu of the set of context menus (e.g., the spatial pattern is distinct to provide a clear visual indication to the user as to which context menu of the set of context menus they are looking at). In some embodiments, each petal of a context menu comprises a color (e.g., to provide a clear visual indication to the user as to which petal of the context menu is which). In some embodiments, the displayed pattern of colors for each petal changes in each context menu of the set of context menus. In some embodiments, the displayed number of petals changes in each context menu of the set of context menus (e.g., the number pattern is distinct to provide a clear visual indication to the user as to which context menu of the set of context menus they are looking at).

Figure 1A:
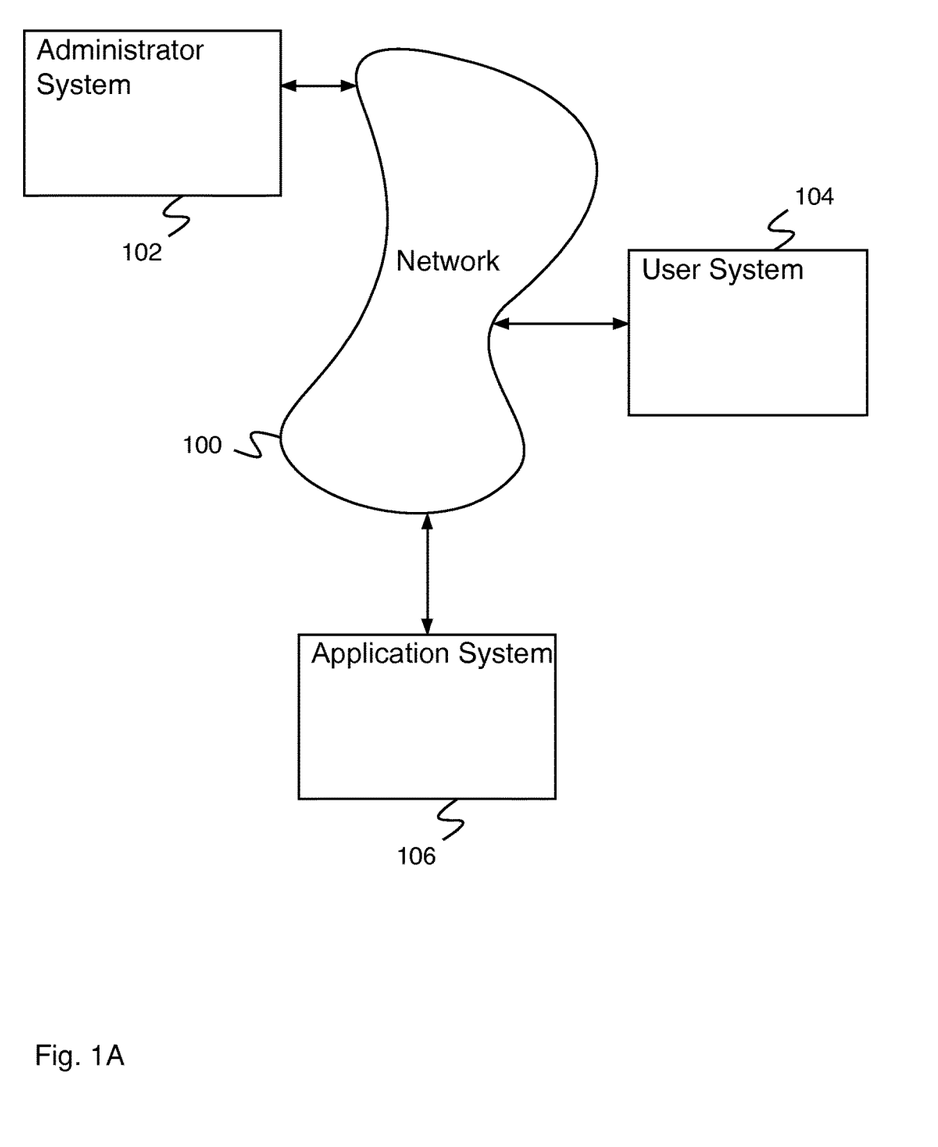
FIG. 1A is a block diagram illustrating an embodiment of a network system.

FIG. 1A is a block diagram illustrating an embodiment of a network system. In some embodiments, the network system of FIG. 1A comprises a system for a touch screen context menu. In the example shown, FIG. 1A comprises network 100. In various embodiments, network 100 comprises one or more of the following: a local area network, a wide area network, a wired network, a wireless network, the Internet, an intranet, a storage area network, or any other appropriate communication network. Administrator system 102, user system 104, and application system 106 communicate via network 100. In various embodiments, administrator system 102 comprises a system for an administrator to access data on application system 106, to create data structures on application system 106, to indicate removal of data structures on application system 106, or for any other appropriate purpose. User system 104 comprises a system for a user. In some embodiments, user system 104 comprises a system for accessing application system 106. In some embodiments, user system 104 comprises a system for accessing or modifying a spreadsheet. In some embodiments, user system 104 defines the available actions and permissions available to user system 104. In some embodiments, user system 104 comprises a touch screen system (e.g., a smartphone, a tablet, a touch screen computer, etc.). In some embodiments, user system 104 comprises a system for a touch screen context menu. Application system 106 comprises a system for managing applications. In some embodiments, application system 106 comprises a system for managing an object-based database. In some embodiments, application system 106 comprises a system for managing spreadsheets. In some embodiments, application system 106 comprises a system for storing data provided by a user (e.g., via user system 104 and network 100). In some embodiments, application system 106 comprises a system for searching data.

In some embodiments, user system 104 comprises a standalone (e.g., not connected to a network) system for a touch screen context menu where the touch screen context menu is used for controlling menus that access data on user system 104.

Figure 1B:
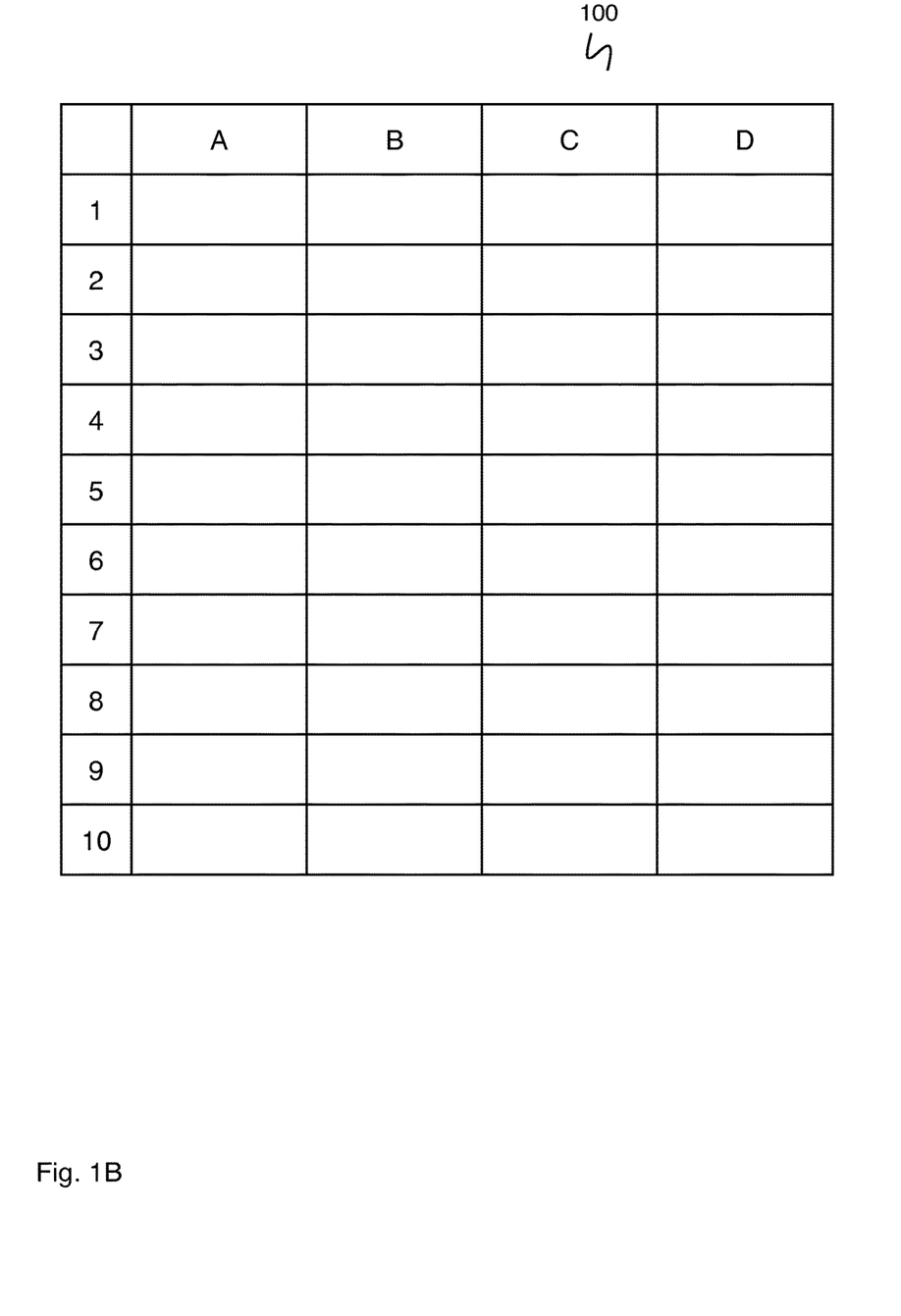
FIG. 1B is a diagram illustrating an embodiment of a spreadsheet.

FIG. 1B is a diagram illustrating an embodiment of a spreadsheet. In some embodiments, spreadsheet 100 of FIG. 1B implements a touch screen context menu. In the example shown, spreadsheet 100 of FIG. 1B comprises a set of cells arranged in a grid. Each cell is associated with a row (e.g., a row associated with a number) and a column (e.g., a column associated with a letter). In various embodiments, a cell stores numbers, letters, formatted data, equations, or any other appropriate information. In some embodiments, a cell, a group of cells, a row, or a column are associated with a set of related actions (e.g., Cut, Copy, Paste, Clear, etc.) that are displayed in a context menu. In some embodiments, an activation indication brings up a context menu. In some embodiments, an activation indication comprises an activation indication to a specific spreadsheet cell, a group of cells, a row, or a column. In various embodiments, an activation indication comprises a tap, a long tap, a hard tap, a double tap, or any other appropriate activation indication. In some embodiments, a dismissal indication dismisses the context menu. In some embodiments, dismissal indication comprises a dismissal indication to a specific context menu. In various embodiments, a dismissal indication comprises a tap, a long tap, a hard tap, a double tap, or any other appropriate dismissal indication.

Figure 2A:
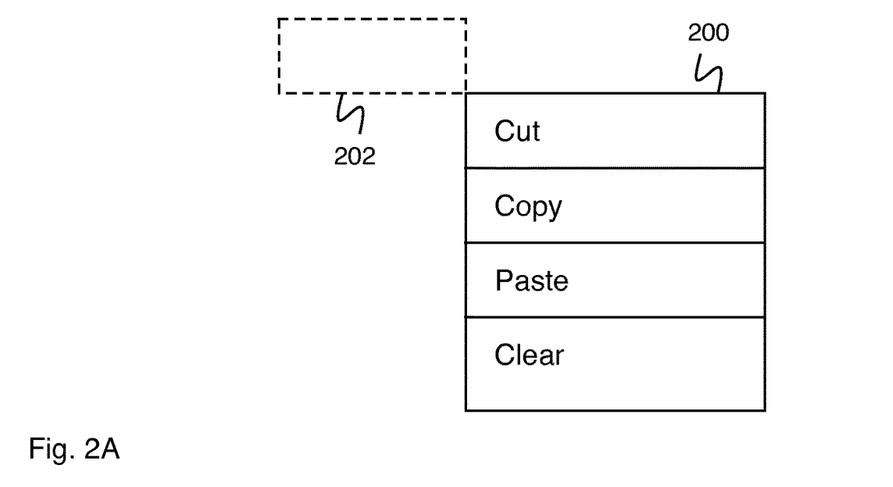
FIG. 2A is a diagram illustrating an embodiment of a context menu.

FIG. 2A is a diagram illustrating an embodiment of a context menu. In some embodiments, context menu 200 is associated with cell 202. In some embodiments, cell 202 comprises a cell of a spreadsheet or a group of cells (e.g., spreadsheet 100 of FIG. 1). In some embodiments, context menu 200 is activated by a user providing a context menu activation indication to cell 202. In the example shown, context menu 200 comprises four possible actions (e.g., Cut, Copy, Paste, and Clear).

Figure 2B:
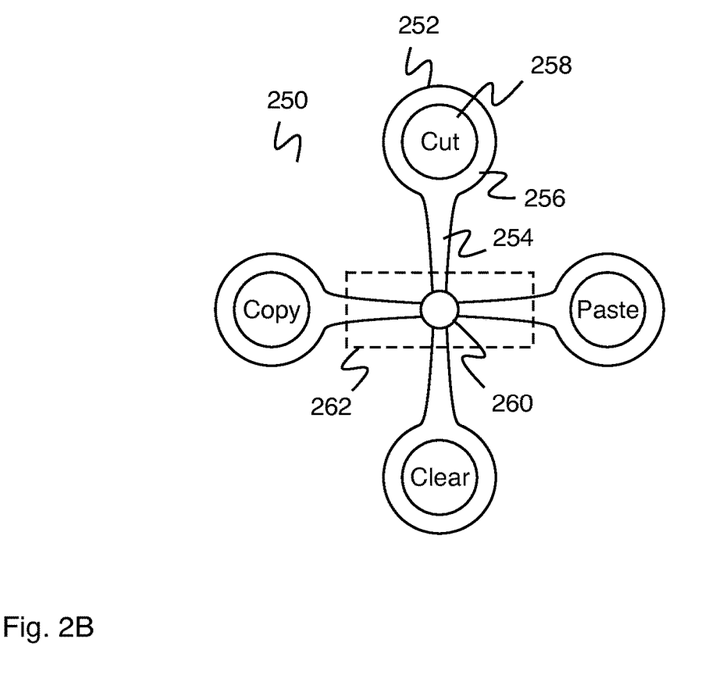
FIG. 2B is a diagram illustrating an embodiment of a context menu.

FIG. 2B is a diagram illustrating an embodiment of a context menu. In some embodiments, context menu 250 comprises a touch screen context menu. In some embodiments, context menu 250 is associated with cell 262. In some embodiments, cell 262 comprises a cell of a spreadsheet (e.g., spreadsheet 100 of FIG. 1). In example shown, context menu 250 comprises a set of petals (e.g., petal 252). Each petal comprises a stem (e.g., stem 254), a leaf (e.g., leaf 256), and a target (e.g., target 258). The set of petals is centered on hub 260. In the example shown, hub 260 is located at the center of cell 262. Each target of a petal of the set of petals is associated with an action. In the example shown, the actions of context menu 250 comprise Cut, Copy, Paste, and Clear.

In some embodiments, each petal is associated with a color. The color associated with a petal is used to color one or more of the petal stem, the petal leaf, and/or the petal target. In some embodiments, the color is used to aid in visually distinguishing one petal from another. In some embodiments, petals are associated with different colors (e.g., the context menu is multicolored). In some embodiments, the context menu is transparent (e.g., display items behind the context menu are partially visible). In various embodiments, context menu 250 comprises one, two, three, four, five, six, or any other appropriate number of petals. In some embodiments, the petals of context menu 250 are arranged symmetrically. In some embodiments, the petals of context menu 250 are arranged asymmetrically. In some embodiments, the petals of context menu 250 are arranged with regular spacing. In some embodiments, the petals of context menu 250 are arranged with irregular spacing. In some embodiments, a design treatment (e.g., a shadowing, a bordering, a glowing, a transparency, etc.) is used to separate a context menu from underlying content.

In some embodiments, a user performs an indication to the context menu. In some embodiments, the indication comprises a selection indication. In various embodiments, a selection indication comprises a tap on a petal, a slide to a petal, a tap (e.g., on the hub) and slide to the petal, or any other appropriate selection indication. In some embodiments, a selection indication selects the action associated with the petal target. In some embodiments, the indication comprises a cycling indication. In various embodiments, a cycling indication comprises a selection of a petal designated with a cycling action, a clockwise circle swipe, a right swipe, or any other appropriate cycling indication. In some embodiments, a cycling indication cycles to a next context menu. In some embodiments, a cycling indication cycles through an ordered sequence of context menus. In some embodiments, a cycling indication cycles through an ordered sequence of petal geometries. In some embodiments, a cycling indication cycles through an ordered sequence of petal colors. In some embodiments, the indication comprises a close indication (e.g., to close the context menu). In various embodiments, a close indication comprises a selection of a petal designated with a close action, an X gesture, a down swipe, or any other appropriate close indication.

Figure 2C:
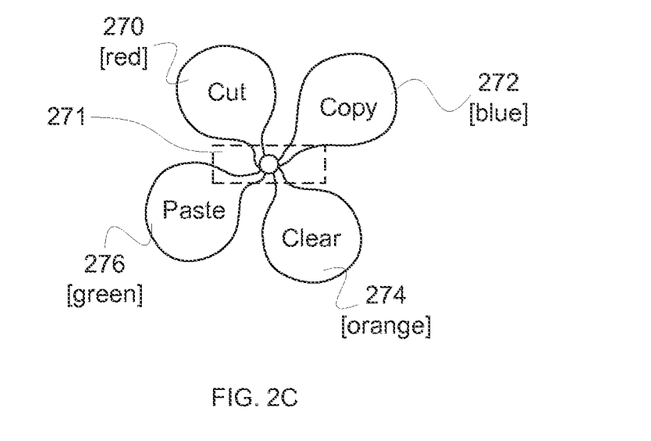
FIG. 2C is a diagram illustrating an embodiment of a context menu.
Figure 2D:
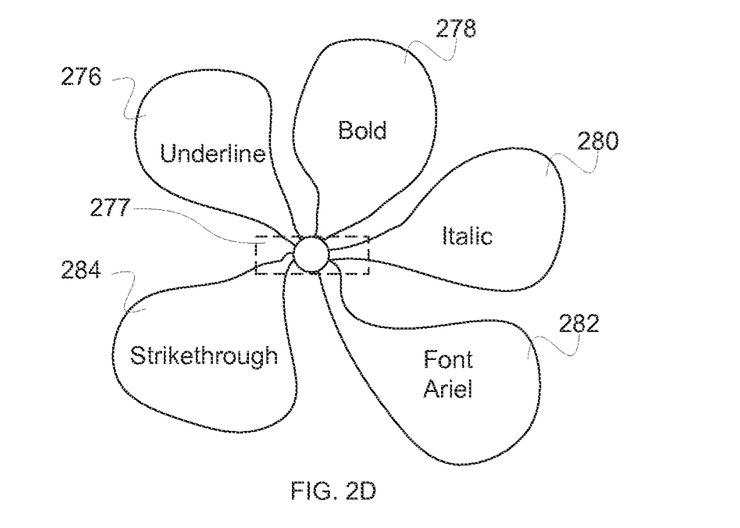
FIG. 2D is a diagram illustrating an embodiment of a context menu.
Figure 2E:
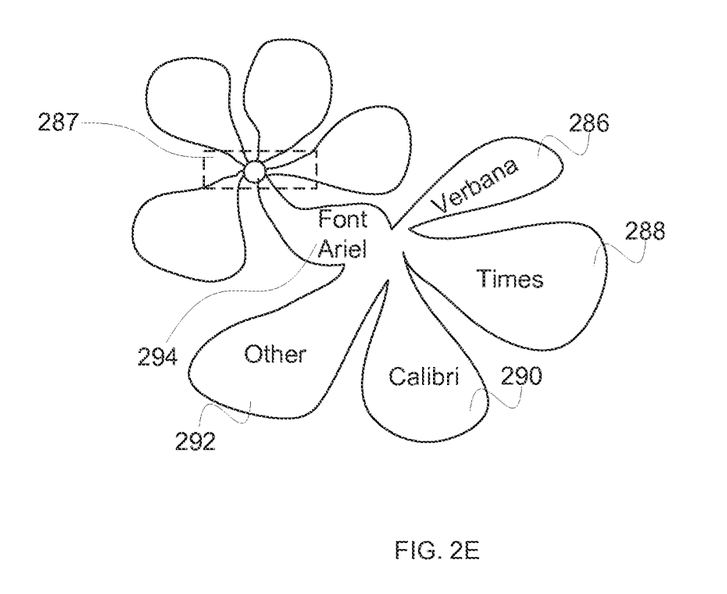
FIG. 2E is a diagram illustrating an embodiment of a context menu.
Figure 2F:
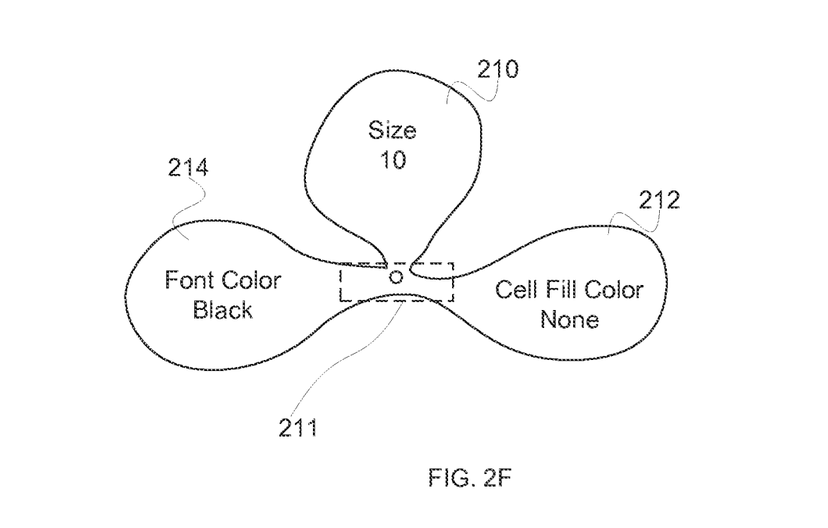
FIG. 2F is a diagram illustrating an embodiment of a context menu.
Figure 2G:
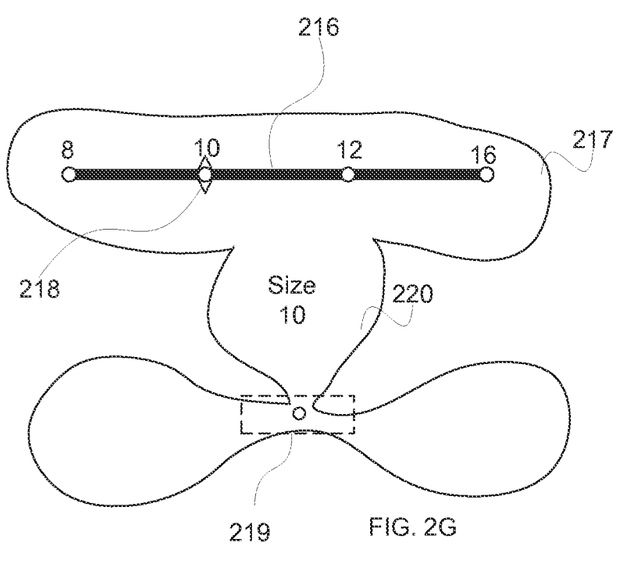
FIG. 2G is a diagram illustrating an embodiment of a context menu.
Figure 2H:
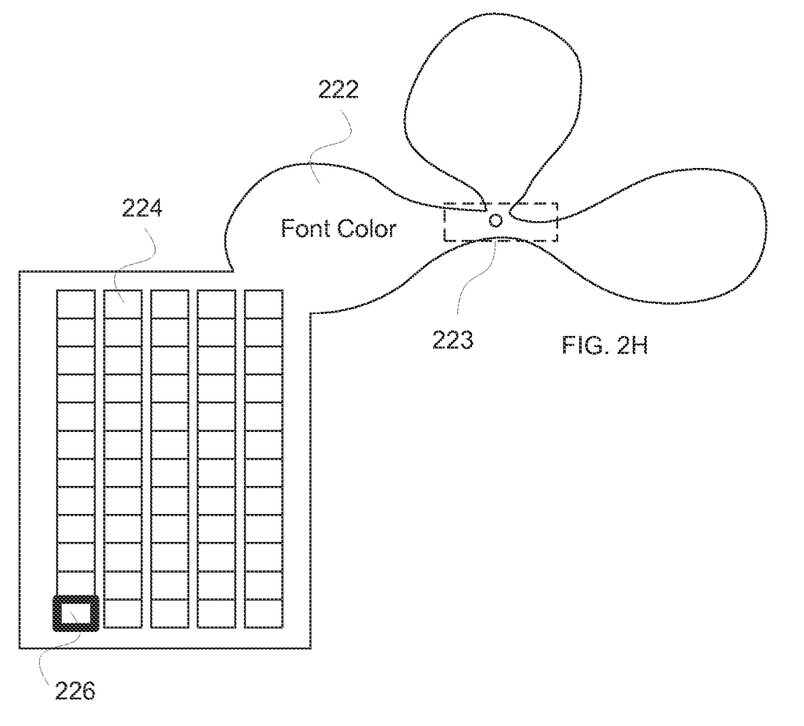
FIG. 2H is a diagram illustrating an embodiment of a context menu.

In some embodiments, FIGS. 2C, 2D, 2E, 2F, 2G, and 2H illustrate an example of a set of menus and sub-menus. For example, FIG. 2C is a menu that is activated with a first tap (e.g., a tap to a selected cell); FIG. 2D is a menu that is activated with a second tap (e.g., a tap to a selected cell/center of the menu); FIG. 2E is a sub-menu of FIG. 2D; FIG. 2F is a menu that is activated with a third tap (e.g., a tap to a selected cell/center of the menu); FIG. 2G and FIG. 2H are sub-menus of FIG. 2F.

FIG. 2C is a diagram illustrating an embodiment of a context menu. In some embodiments, the context menu of FIG. 2C is provided by an application system (e.g., application system 106). In the example shown, first a cell (e.g., cell 271) or a region (e.g., multiple cells that are contiguous) is selected in a spreadsheet. An activation indication (e.g., a single tap) is used to signal that a context menu (e.g., an edit menu) is to appear. A context menu is provided to a display comprising a plurality of petals (e.g., petal 270, petal 272, petal 274, and petal 276). Petal 270 has a label "Cut" and is colored with color "red" (as indicated using "[red]" in FIG. 2C). Petal 272 has a label "Copy" and is colored with color "blue" (as indicated using "[blue]" in FIG. 2C). Petal 274 has a label "Clear" and is colored with color "orange" (as indicated using "[orange]" in FIG. 2C). Petal 276 has a label "Paste" and is colored with color "green" (as indicated using "[green]"). In some embodiments, an icon accompanies the label on a petal. In some embodiments, the context menu and the plurality of petals is transparent. In some embodiments, selecting a petal of the plurality of petals activates a corresponding action. In some embodiments, a petal label is greyed out or absent in the event that the corresponding action is not possible (e.g., paste is greyed out in the event that no content to paste).

FIG. 2D is a diagram illustrating an embodiment of a context menu. In some embodiments, the context menu of FIG. 2D is provided by an application system (e.g., application system 106). In the example shown, first a cell (e.g., cell 277) or a region (e.g., multiple cells that are contiguous) is selected in a spreadsheet. An activation indication (e.g., a double tap) is used to signal that a second context menu (e.g., a font format menu) is to appear. A context menu is provided to a display comprising a plurality of petals (e.g., petal 276, petal 278, petal 280, petal 282, and petal 284). Petal 276 has a label "Underline". Petal 278 has a label "Bold". Petal 280 has a label "Italic". Petal 282 has a label "Font Ariel". Petal 284 has label "Strikethrough". In some embodiments, menus have different numbers and different petal orientations to be visually distinct. In some embodiments, a selection of a petal performs the format change. In some embodiments, selection of petal 282 opens a sub-menu.

FIG. 2E is a diagram illustrating an embodiment of a context menu. In some embodiments, the context menu of FIG. 2E is provided by an application system (e.g., application system 106). In the example shown, cell 287 is selected and a menu is displayed in a spreadsheet. Sub-menu for petal 294 label "Font, Ariel" is displayed in response to an activation indication on petal 294. In some embodiments, petal 294 prior to activation comprises petal 282 of FIG. 2D. Sub-menu for petal 294 includes petal 286, petal 288, petal 290, and petal 292. Petal 286 has a label "Verbana". Petal 288 has a label "Times". Petal 290 has a label "Calibri". Petal 292 has a label "Other". In some embodiments, menus have different numbers and different petal orientations to be visually distinct. In some embodiments, a selection of a petal performs the format change.

FIG. 2F is a diagram illustrating an embodiment of a context menu. In some embodiments, the context menu of FIG. 2F is provided by an application system (e.g., application system 106). In the example shown, first a cell (e.g., cell 211) or a region (e.g., multiple cells that are contiguous) is selected in a spreadsheet. An activation indication (e.g., a triple tap) is used to signal that a third context menu (e.g., a font/fill menu) is to appear. A context menu is provided to a display comprising a plurality of petals (e.g., petal 210, petal 212, and petal 214). Petal 210 has a label "Size 10". Petal 212 has a label "Cell Fill Color None". Petal 214 has a label "Font Color Black". In some embodiments, menus have different numbers and different petal orientations to be visually distinct. In some embodiments, a selection of a petal performs the format change. In some embodiments, selection of petal 210 or petal 214 opens a sub-menu.

FIG. 2G is a diagram illustrating an embodiment of a context menu. In some embodiments, the context menu of FIG. 2G is provided by an application system (e.g., application system 106). In the example shown, cell 219 is selected and a menu displayed in a spreadsheet. Sub-menu for petal 220 labeled "Size 10" is displayed in response to an activation indication on petal 220. Sub-menu for petal 220 includes petal 217 with slider bar 216 with selector 218. In some embodiments, a selection of slider bar performs the font size change.

FIG. 2H is a diagram illustrating an embodiment of a context menu. In some embodiments, the context menu of FIG. 2H is provided by an application system (e.g., application system 106). In the example shown, cell 223 is selected and a menu is displayed in a spreadsheet. Sub-menu for petal 222 labeled "Font Color" is displayed in response to an activation indication on petal 222. Sub-menu for petal 222 includes a color selection table 224. In some embodiments, a selection of a color (e.g., table 224). In some embodiments, the font color for the cell is selected by indicating a square (e.g., square 226) in table 224.

Figure 3A:
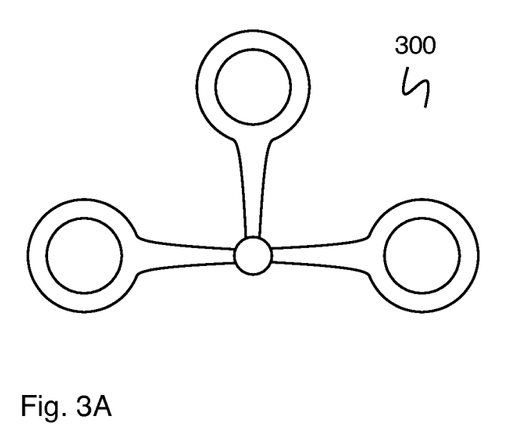
FIG. 3A is a diagram illustrating an embodiment of a context menu.

FIG. 3A is a diagram illustrating an embodiment of a context menu. In some embodiments, context menu 300 comprises context menu 250 in FIG. 2B, wherein the set of petals comprises three petals. In the example shown, context menu 300 comprises three petals spaced at 90 degree intervals. Note that the asymmetry of the spatial arrangement is easily distinguished from a set of three petals in 4 orientation (e.g., with no petal on the bottom side (shown), on the left side, on the top side, or on the right side). A sequence of context menus with an asymmetric arrangement each oriented differently allows for rapid identification of the appropriate context menu.

Figure 3B:
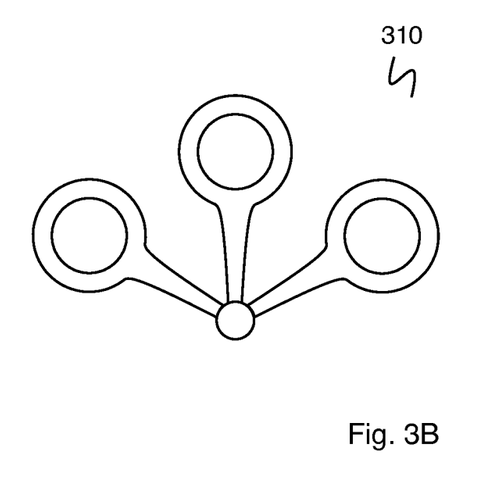
FIG. 3B is a diagram illustrating an embodiment of a context menu.

FIG. 3B is a diagram illustrating an embodiment of a context menu. In some embodiments, context menu 310 comprises context menu 250 of FIG. 2B, wherein the set of petals comprises three petals. In the example shown, context menu 300 comprises three petals spaced at 60 degree intervals. Note that the asymmetry of the spatial arrangement is easily distinguished from a set of three petals in six orientations. A sequence of context menus with an asymmetric arrangement each oriented differently allows for rapid identification of the appropriate context menu.

Figure 3C:
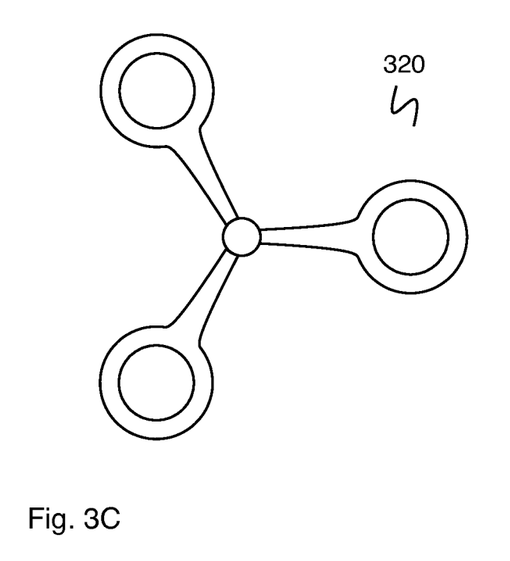
FIG. 3C is a diagram illustrating an embodiment of a context menu.

FIG. 3C is a diagram illustrating an embodiment of a context menu. In some embodiments, context menu 320 comprises context menu 250 of FIG. 2B, wherein the set of petals comprises three petals. In the example shown, context menu 300 comprises three petals spaced at 120 degree intervals. In various embodiments, the petals of a context menu are spaced at any appropriate interval. In some embodiments, the petals of a context menu are spaced at varying intervals. In some embodiments, the petals of a context menu are spaced in an asymmetric pattern.

Figure 4A:
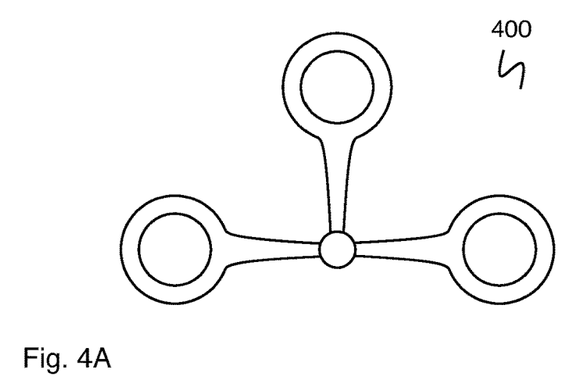
FIG. 4A is a diagram illustrating an embodiment of a context menu.

FIG. 4A is a diagram illustrating an embodiment of a context menu. In some embodiments, context menu 400 comprises context menu 250 of FIG. 2, wherein the set of petals comprises three petals. In the example shown, context menu 400 comprises three petals with typical width stems.

Figure 4B:
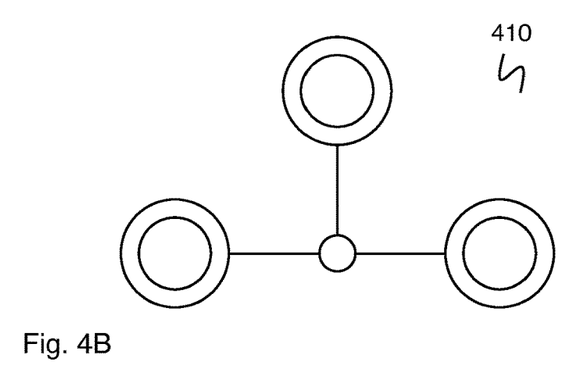
FIG. 4B is a diagram illustrating an embodiment of a context menu.

FIG. 4B is a diagram illustrating an embodiment of a context menu. In some embodiments, context menu 410 comprises context menu 250 of FIG. 2, wherein the set of petals comprises three petals. In the example shown, context menu 410 comprises three petals with narrow stems.

Figure 4C:
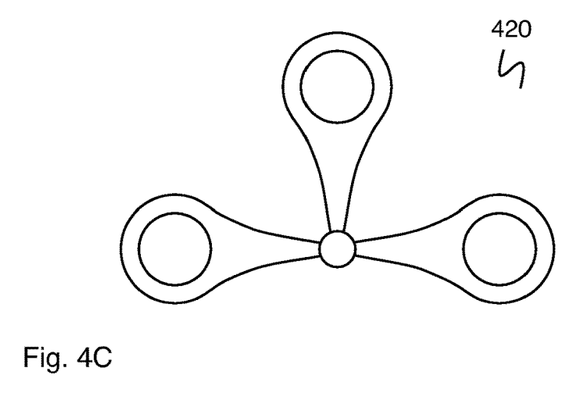
FIG. 4C is a diagram illustrating an embodiment of a context menu.

FIG. 4C is a diagram illustrating an embodiment of a context menu. In some embodiments, context menu 420 comprises context menu 250 of FIG. 2, wherein the set of petals comprises three petals. In the example shown, context menu 420 comprises three petals with wide stems. In various embodiments, the stems of the petals of a context menu have any appropriate width.

Figure 5A:
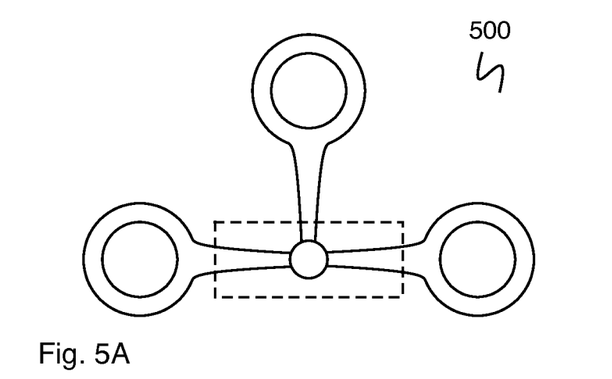
FIG. 5A is a diagram illustrating an embodiment of a context menu.

FIG. 5A is a diagram illustrating an embodiment of a context menu. In some embodiments, context menu 500 comprises context menu 250 of FIG. 2B, wherein the set of petals comprises three petals. In the example shown, the three petals of context menu 500 are centered on a hub located at the center of a spreadsheet cell.

Figure 5B:
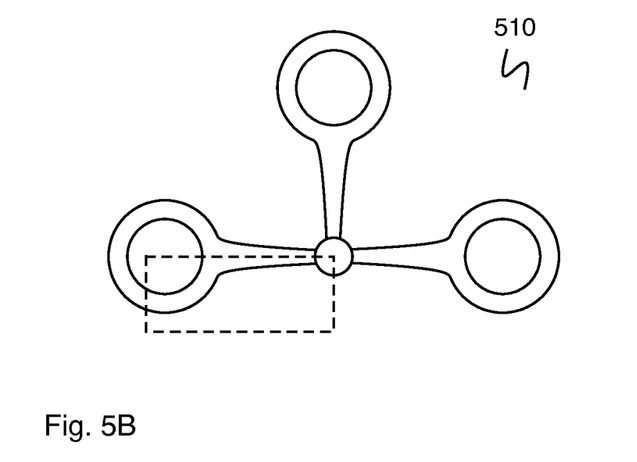
FIG. 5B is a diagram illustrating an embodiment of a context menu.

FIG. 5B is a diagram illustrating an embodiment of a context menu. In some embodiments, context menu 510 comprises context menu 250 of FIG. 2B, wherein the set of petals comprises three petals. In the example shown, the three petals of context menu 510 are centered on a hub located at the upper right corner of a spreadsheet cell.

Figure 6:
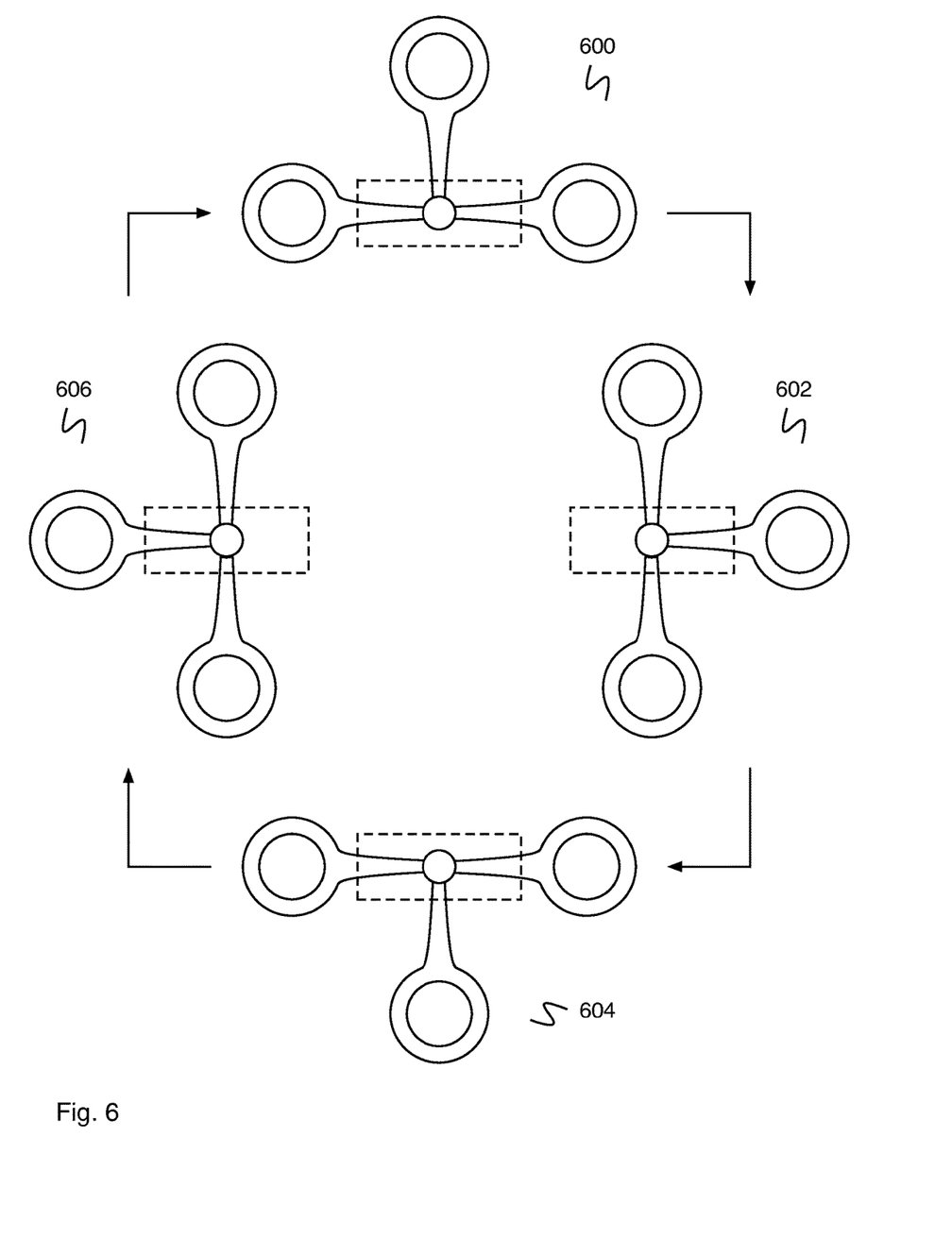
FIG. 6 is a diagram illustrating an embodiment of a context menu cycle.

FIG. 6 is a diagram illustrating an embodiment of a context menu cycle. In some embodiments, context menu 600, context menu 602, context menu 604, and context menu 606 comprise a single context menu. In some embodiments, the context menu comprised by context menu 600, context menu 602, context menu 604, and context menu 606 comprises context menu 250 of FIG. 2. In the example shown, context menu 600, context menu 602, context menu 604, and context menu 606 each comprise a next menu action (e.g., activated by selecting a next menu action associated with a target). The next menu action associated with context menu 600 causes context menu 600 to disappear and be replaced with context menu 602. The next menu action associated with context menu 602 causes context menu 602 to disappear and be replaced with context menu 604. The next menu action associated with context menu 604 causes context menu 604 to disappear and be replaced with context menu 606. The next menu action associated with context menu 606 causes context menu 606 to disappear and be replaced with context menu 600. In the example shown, each of context menu 600, context menu 602, context menu 604, and context menu 606 have a different petal arrangement (e.g., for easy visual identification of which menu is shown). In some embodiments, each of context menu 600, context menu 602, context menu 604, and context menu 606 have different color patterns (e.g. colors associated with each petal, e.g., for easy visual identification of which menu is shown). In the example shown, each of context menu 600, context menu 602, context menu 604, and context menu 606 are centered on a hub at a single point.

Figure 7:
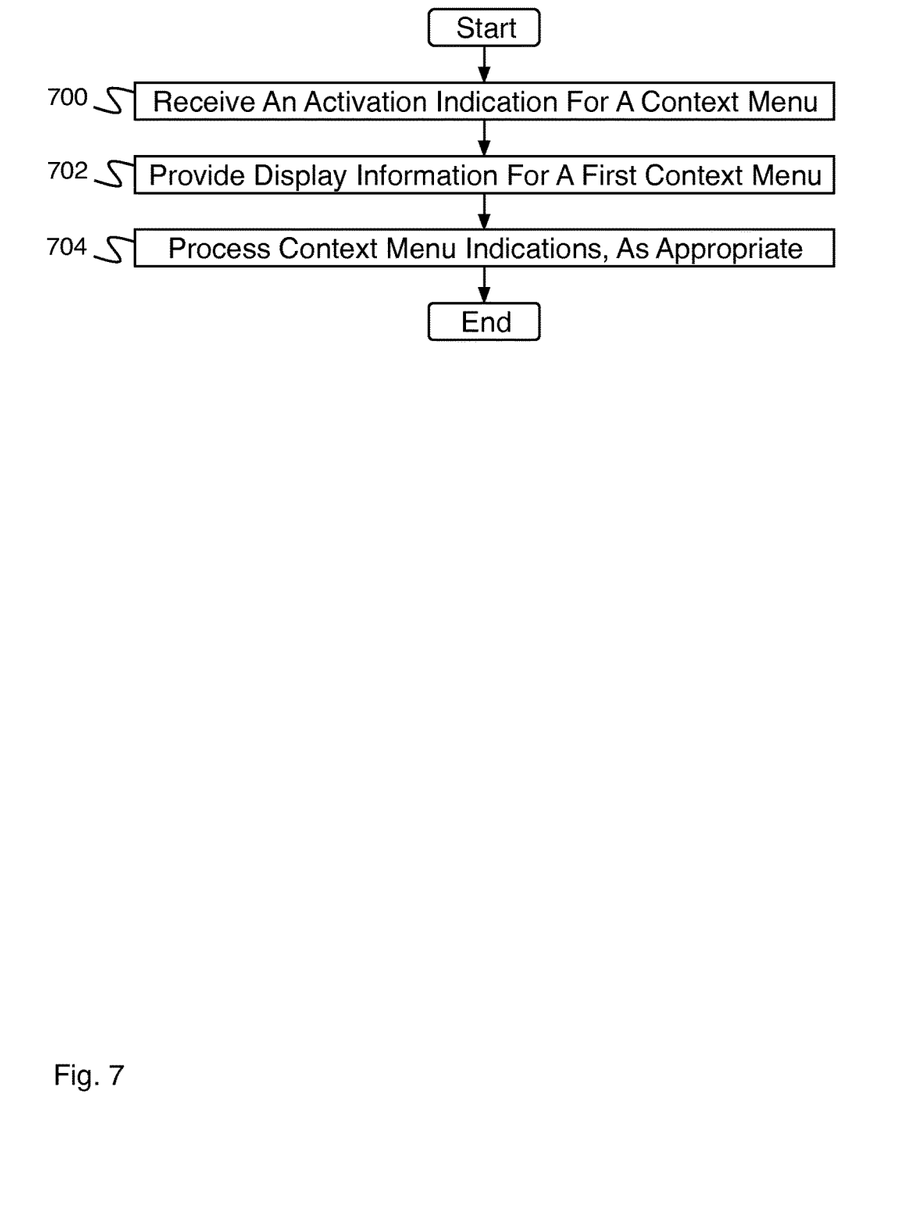
FIG. 7 is a flow diagram illustrating an embodiment of a process for a system for a touch screen context menu.

FIG. 7 is a flow diagram illustrating an embodiment of a process for a system for a touch screen context menu. In some embodiments, a system executing the process of FIG. 7 provides a touch screen context menu (e.g., touch screen context menu 250 of FIG. 2B). In the example shown, in 700, an activation indication for a context menu is received. In various embodiments, an activation indication for a context menu comprises a tap, a long tap, a hard tap, a double tap, or any other appropriate activation indication for a context menu. In 702, display information for a first context menu is provided. In 704, context menu indications are processed as appropriate.

Figure 8:
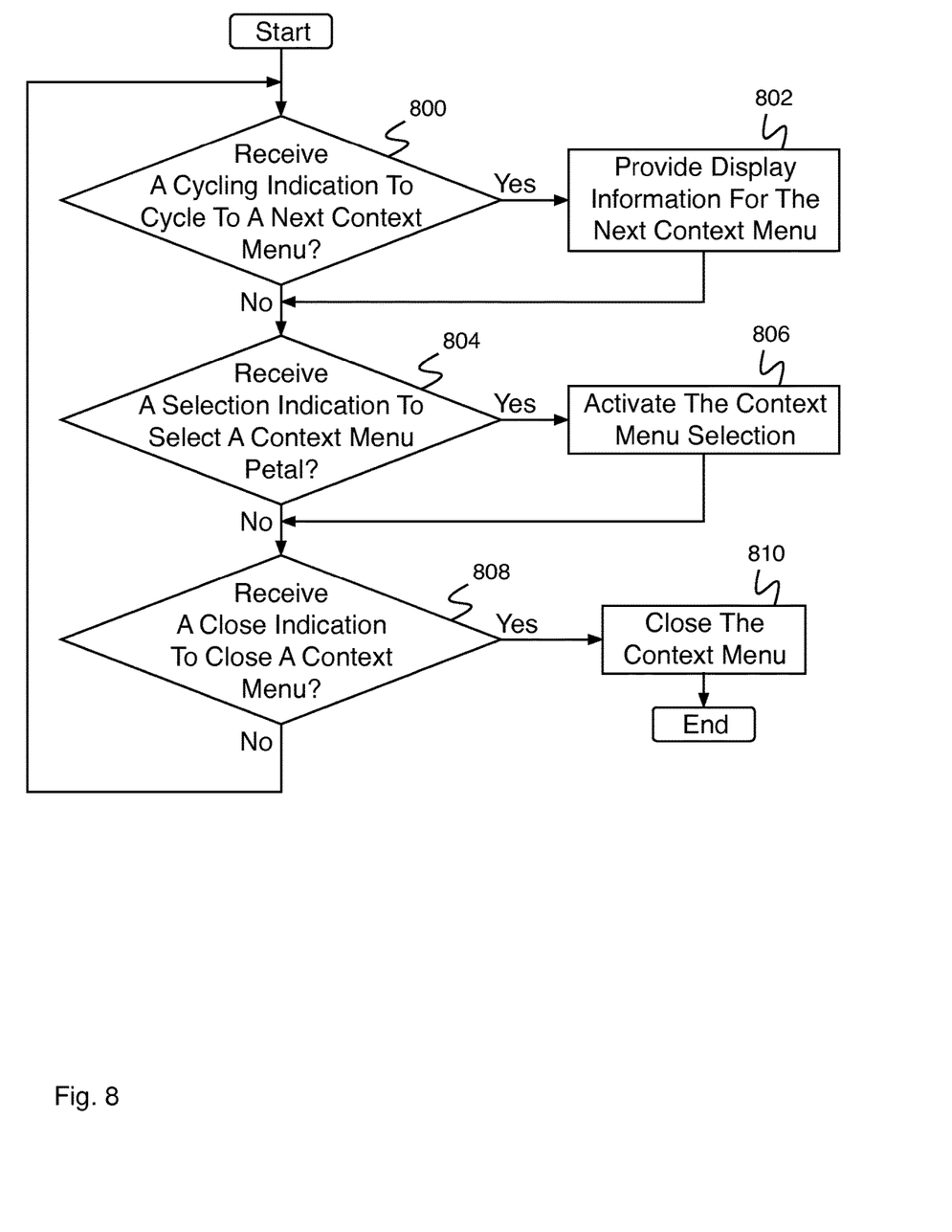
FIG. 8 is a flow diagram illustrating an embodiment of a process for processing context menu indications, as appropriate.

FIG. 8 is a flow diagram illustrating an embodiment of a process for processing context menu indications, as appropriate. In some embodiments, the process of FIG. 8 implements 704 of FIG. 4. In the example shown, in 800, it is determined whether a cycling indication to cycle to a next context menu is received. In some embodiments, a cycling indication cycles through an ordered sequence of context menus. In some embodiments, an ordered sequence of context menus comprises a cut menu, a copy menu, and a paste menu. In some embodiments, a cycling indication cycles through an ordered sequence of petal geometries. In some embodiments, a cycling indication cycles through an ordered sequence of petal colors.

In the event it is determined that a cycling indication was not received, control passes to 804. In the event it is determined that a cycling indication was received, control passes to 802. In 802, display information for the next context menu is provided. Control then passes to 804. In 804, it is determined whether a selection indication to select a context menu petal is received. In the event it is determined that a selection indication to select a context menu petal is not received, control passes to 808. In the event it is determined that a selection indication to select a context menu petal is received, control passes to 806. In 806, the context menu selection is activated (e.g., the selected action is performed). Control then passes to 808. In 808, it is determined whether a close indication to close a context menu is received. In the event it is determined that a close indication to close a context menu is not received, control passes to 800. In the event it is determined that a close indication to close a context menu is received, control passes to 810. In 810, the context menu is closed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system for context menus, comprising:
an input interface to receive an activation indication for a first context menu and a cycling indication to cycle from the first context menu to a next context menu; and
a processor to:
provide display information for the first context menu in response to the activation indication, wherein the first context menu comprises a first set of petals in a first pattern centered on an item;
provide display information for a submenu of the first context menu in response to a selection indication, wherein the selection indication is received using the input interface of a petal of the first set of petals, and wherein the submenu comprises a second set of petals in a second pattern extending from the petal of the first set of petals; and provide the next context menu in response to the cycling indication, wherein successive cycling indications cycle through an ordered sequence of context menus, wherein the ordered sequence of context menus comprises one or more of an ordered sequence of petal geometries and an ordered sequence of petal colors.

2. The system of claim 1, wherein the activation indication comprises a tap.

3. The system of claim 1, wherein the activation indication comprises a double tap.

4. The system of claim 1, wherein the activation indication comprises a hard tap.

5. The system of claim 1, wherein the activation indication comprises an activation indication for a spreadsheet cell.

6. The system of claim 1, wherein the context menu is multicolored.

7. The system of claim 1, wherein the context menu is transparent.

8. The system of claim 1, wherein the item comprises a spreadsheet cell.

9. The system of claim 1, wherein the first pattern or the second pattern is asymmetric.

10. The system of claim 1, wherein the first pattern or the second pattern comprises three petals.

11. The system of claim 1, wherein the ordered sequence of context menus comprises a cut menu, a copy menu, and a paste menu.

12. The system of claim 1, wherein the selection indication comprises a tap on the petal.

13. The system of claim 1, wherein the selection indication comprises a slide to the petal.

14. The system of claim 1, wherein the selection indication comprises a tap and slide to the petal.

15. The system of claim 1, wherein the input interface is further to receive a close indication to close the context menu.

16. The system of claim 15, wherein the close indication comprises an X gesture.

17. A method for context menus, comprising:

receiving an activation indication for a first context menu and a cycling indication to cycle from the first context menu to a next context menu;

providing, using a processor, display information for the first context menu in response to the activation indication, wherein the first context menu comprises a first set of petals in a first pattern centered on an item;

providing display information for a submenu of the context first context menu in response to a selection indication, wherein the selection indication is received using the input interface of a petal of the first set of petals, and wherein the submenu comprises a second set of petals in a second pattern extending from the petal of the first set of petals; and provide the next context menu in response to the cycling indication, wherein successive cycling indications cycle through an ordered sequence of context menus, wherein the ordered sequence of context menus comprises one or more of an ordered sequence of petal geometries and an ordered sequence of petal colors.

18. A computer program product for context menus, the computer program product being embodied in a non-transitory computer readable storage medium and comprising computer instructions for:

receiving an activation indication for a first context menu and a cycling indication to cycle from the first context menu to a next context menu;

providing display information for the first context menu in response to the activation indication, wherein the first context menu comprises a first set of petals in a first pattern centered on an item;

providing display information for a submenu of the first context menu in response to the a selection indication, wherein the selection indication is received using the input interface of a petal of the first set of petals, and wherein the submenu comprises a second set of petals in a second pattern extending from the petal of the first set of petals; and providing the next context menu in response to the cycling indication, wherein successive cycling indications cycle through an ordered sequence of context menus, wherein the ordered sequence of context menus comprises one or more of an ordered sequence of petal geometries and an ordered sequence of petal colors.

* * * * *

UNITED STATES PATENT AND TRADEMARK OFFICE
CERTIFICATE OF CORRECTION

PATENT NO. : 10,282,058 B1  
APPLICATION NO. : 14/866596  
DATED : May 7, 2019  
INVENTOR(S) : Sayan Chakraborty et al.

Page 1 of 1

It is certified that error appears in the above-identified patent and that said Letters Patent is hereby corrected as shown below:

In the Claims

In Column 10, Claim 17, Lines 9-10, after "submenu of the", delete "context".

Signed and Sealed this  
Seventeenth Day of December, 2019

Andrei Iancu  
*Director of the United States Patent and Trademark Office*